H. R. Walton,
Hay Press.

No. 102,463. Patented Apr. 26, 1870.

Witnesses:
J. B. Graham
Norris Peters

Inventor:
Henry R. Walton

United States Patent Office.

HENRY R. WALTON, OF PHILADELPHIA, PENNSYLVANIA.

Letters Patent No. 102,463, dated April 26, 1870.

IMPROVEMENT IN HAY AND COTTON-PRESSES.

The Schedule referred to in these Letters Patent and making part of the same.

I, HENRY R. WALTON, of Philadelphia, in the county of Philadelphia and State of Pennsylvania, have invented certain new and useful Improvements in Hay and Cotton-Presses, and method of operating the same; and I do hereby declare that the following is a full, clear, and exact description thereof, reference being had to the accompanying drawing making part of this specification, and to the letters of reference marked thereon, like letters indicating like parts wherever they occur.

To enable others skilled in the art to construct and use my invention, I will proceed to describe it.

The nature of my invention consists in the combination of a beater-press for hay, cotton, or other similar substances, with a platform-scale, so arranged that when the requisite amount of hay, cotton, or other substances to be pressed is thrown into the box the scale-beam will rise and operate a trigger, which will trip a connecting-rod and let fall the beater.

Figure 1:
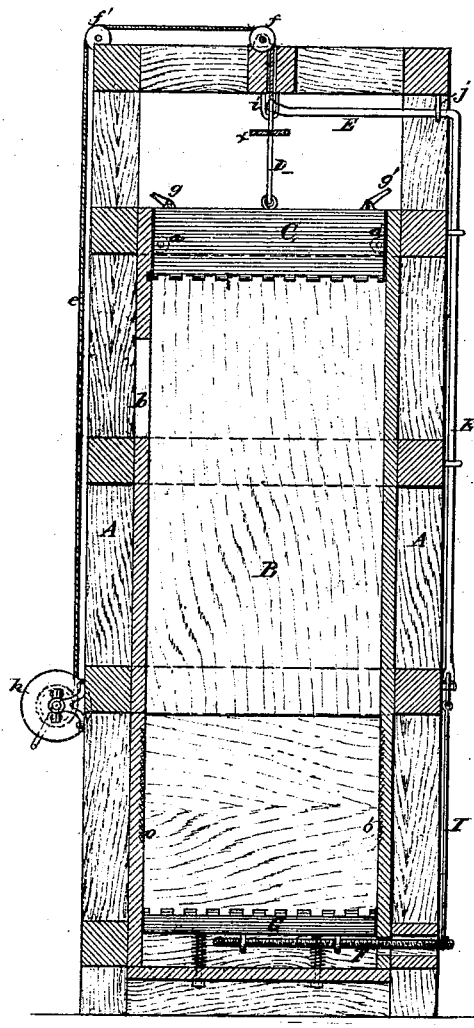
Figure 1 represents a vertical section of my press.
Figure 2:
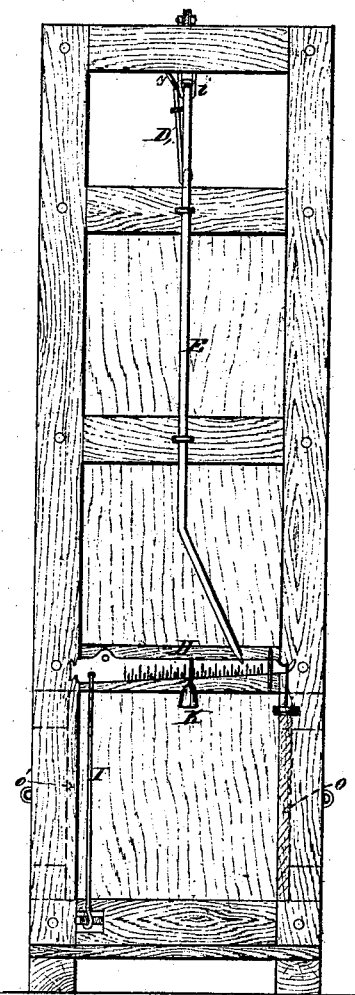
Figure 2 represents an end view of the same, showing the scale and tripping device.

A is the frame of the press, which frame should be braced on the outside to resist the pressure within the box.

B is the press-box, in which the substance to be pressed is placed.

C is the beater, with grooves on its lower side, and having friction-rollers $a$ $a'$ on each end.

D is a hook-shaped rod, provided with a cross-bar, $x$, which, impinging upon the inclines $y$, insures the release of the hooked rod D. Said rod is attached to the beater by means of an eye-bolt.

E is an L-shaped tripping-lever, the upper end of which passes through hooks $i$ and $j$, attached to the upper part of frame A. The upper end of rod D rests upon and is operated by lever E.

The lower end of lever E is notched, and rests upon the scale-beam H, near its head.

G is a platform-scale which forms the bottom of the press. The top of said platform is grooved, so as to receive the bagging and ropes, in which the bale is enveloped after being pressed.

$b$ is an opening in the end of the box or frame, near its top, for the introduction of hay, cotton, &c. The beater C is raised by means of a rope, $e$, attached to a ring on its upper side.

Said rope passes over pulleys $f f'$, and is operated by a drum or windlass, $h$, placed at the lower end of the press. It can also be operated by any of the mechanical equivalents thereof.

Operation.

The weight K is placed on the scale-beam to indicate the number of pounds of substance to be pressed. The hay, cotton, or other substance is then thrown into the press-box through the opening $b$.

When a sufficient quantity in the box reaches the number of pounds indicated on the scale-beam, said beam will rise, thereby operating the tripping-lever E, which will release rod D and allow the beater to descend.

In order to gain the momentum, and to prevent the rebound of the beater, four pawls, $g$ $g'$, are fixed on the top of said beater, which, after falling, said pawls $g$ $g'$ will engage with teeth $o$ $o'$ on the inside of the press-box, near its bottom.

Said pawls can be released after the bale is pressed, and said bale thrown out of the box through the doors O O'.

Said press can be operated by either a screw, or toggle-levers.

I do not confine myself to the platform-scale hereinbefore mentioned. Any balance-scale may be used.

What I claim as new, and desire to secure by Letters Patent, is—

1. The hay or cotton-press substantially as shown, in combination with a scale and beater, constructed and automatically operated substantially as and for the purpose herein set forth.

2. The combination, in a press, of the scale G and beam H, with tripping-lever E, rod D, and beater C, all operating together substantially as herein described.

HENRY R. WALTON.

Witnesses:
W. B. FRENCH,
H. PETERS.